US009240936B2

United States Patent
Kanamarlapudi et al.

(10) Patent No.: US 9,240,936 B2
(45) Date of Patent: Jan. 19, 2016

(54) METHODS AND APPARATUS FOR IMPROVING CALL PERFORMANCE BY ENABLING UPLINK TRANSMISSIONS DURING POOR DOWNLINK RADIO CONDITIONS

(71) Applicant: QUALCOMM Incorporated, San Diego, CA (US)

(72) Inventors: Sitaramanjaneyulu Kanamarlapudi, San Diego, CA (US); Rohit Kapoor, San Diego, CA (US); Rashid Ahmed Akbar Attar, San Diego, CA (US); Liangchi Hsu, San Diego, CA (US); Yi Zhang, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 14/095,492

(22) Filed: Dec. 3, 2013

(65) Prior Publication Data

US 2014/0348010 A1     Nov. 27, 2014

Related U.S. Application Data

(60) Provisional application No. 61/826,774, filed on May 23, 2013.

(51) Int. Cl.
*H04L 12/26*     (2006.01)
*H04W 28/04*     (2009.01)
(Continued)

(52) U.S. Cl.
CPC .............. *H04L 43/0847* (2013.01); *H04L 1/00* (2013.01); *H04W 28/04* (2013.01); *H04W 52/0245* (2013.01); *H04W 56/00* (2013.01); *Y02B 60/50* (2013.01)

(58) Field of Classification Search
None
See application file for complete search history.

(56) References Cited

U.S. PATENT DOCUMENTS 7,864,724 B2 *   1/2011   Kaikkonen et al. ............ 370/318
8,116,211 B2 *   2/2012   Ishii et al. ..................... 370/242
(Continued)

FOREIGN PATENT DOCUMENTS

EP     1 881 657 A1     1/2008
WO     WO 2012/136592 A1     10/2012

OTHER PUBLICATIONS

"3rd Generation Partnership Project; Technical Specification Group Radio Access Network; Radio Resource Control (RRC); Protocol specification (Release 9)", 3GPP Standard; 3GPP TS 25.331, 3rd Generation Partnership Project (3GPP), Mobile Competence Centre; 650, Route Des Lucioles; F-06921 Sophia-Antipolis Cedex; France, vol. RAN WG2, No. V9.13.0, Jan. 2, 2013, pp. 1-1826, XP050691619 (1827 pages).

(Continued)

*Primary Examiner* — Habte Mered
(74) *Attorney, Agent, or Firm* — Arent Fox LLP (57) ABSTRACT

Apparatus and methods of improving call performance by enabling/continuing uplink transmissions during poor downlink radio conditions. The apparatus and methods further include monitoring, by a user equipment (UE), downlink (DL) signal conditions associated with a serving Node B. Moreover, the apparatus and methods include triggering an out-of-sync state upon a determination that the DL signal conditions have degraded beyond a DL signal quality threshold. Additionally, the apparatus and methods include delaying turning off of a power amplifier (PA) associated with transmission of uplink (UL) messages for a call performance improvement threshold time duration.

24 Claims, 7 Drawing Sheets

(51) Int. Cl.
*H04L 1/00* (2006.01)
*H04W 52/02* (2009.01)
*H04W 56/00* (2009.01)

(56) References Cited

U.S. PATENT DOCUMENTS

| | | | |
|---|---|---|---|
| 8,160,075 B2 | 4/2012 | Kazmi et al. | |
| 8,369,883 B2 | 2/2013 | Kuroda et al. | |
| 2013/0021992 A1 | 1/2013 | Marco et al. | |
| 2013/0083672 A1 | 4/2013 | Johansson et al. | |
| 2013/0210422 A1* | 8/2013 | Pani et al. | 455/423 |
| 2013/0301542 A1* | 11/2013 | Krishnamurthy et al. | 370/329 |
| 2014/0086050 A1* | 3/2014 | Swann et al. | 370/235 |

OTHER PUBLICATIONS

International Search Report and Written Opinion—PCT/US2014/039166—ISA/EPO—Sep. 30, 2014—(12 pages).

Motorola: "Test case development for radio link monitoring", 3GPP Draft; R4-090055, 3rd Generation Partnership Project (3GPP), Mobile Competence Centre; 650, Route Des Lucioles; F-06921 Sophia-Antipolis Cedex; France, No. Ljubljana; 20090112, Jan. 12, 2009, XP050326565 (5 Pages).

Nokia: 3GPP Draft; R1-99J59, 3rd Generation Partnership Project (3GPP), Mobile Competence Centre; 650, Route Des Lucioles; F-06921 Sophia-Antipolis Cedex; France, vol. RAN WG1, No. Dresden, Germany; 19991209, Dec. 9, 1999, XP050091096 (6 pages).

Samsung et al: "Radio Link failure handling in LTE", 3GPP Draft; R2-063171 Radio Link Failure, 3rd Generation Partnership Project (3GPP), Mobile Competence Centre; 650, Route Des Lucioles; F-06921 Sophia-Antipolis Cedex; France, vol. RAN WG2, No. Riga, Latvia; Nov. 1, 2006, XP050132674 (4 pages).

\* cited by examiner

METHODS AND APPARATUS FOR IMPROVING CALL PERFORMANCE BY ENABLING UPLINK TRANSMISSIONS DURING POOR DOWNLINK RADIO CONDITIONS

CLAIM OF PRIORITY UNDER 35 U.S.C. §119

The present Application for Patent claims priority to Provisional Application No. 61/826,774 entitled "METHODS AND APPARATUS FOR IMPROVING CALL PERFORMANCE BY ENABLING UPLINK TRANSMISSIONS DURING POOR DOWNLINK RADIO CONDITIONS" filed May 23, 2013, and assigned to the assignee hereof and hereby expressly incorporated by reference herein.

BACKGROUND

Aspects of the present disclosure relate generally to wireless communication systems, and more particularly, to improvement of call performance during poor downlink radio conditions.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

It is noted that one problem with current implementations relate to improving call performance during poor downlink radio conditions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving call performance by enabling/continuing uplink transmissions during poor downlink radio conditions. In one example, a communications device (e.g., a UE) is equipped to monitor DL signal conditions associated with a serving Node B, trigger an out-of-sync state upon a determination that the DL signal conditions have degraded beyond a DL signal quality threshold, and delay turning off of a PA associated with transmission of UL messages for a call performance improvement threshold time duration. In an aspect, the UE may be further configured to perform functions one or more measurements during at least a portion of the call performance improvement threshold time duration, and transmit a first message (e.g., a signaling message and/or data message) to the serving Node B.

In another aspect, a computer program product comprising a computer-readable medium includes at least one instruction executable to cause a computer to monitor, by a user equipment (UE), downlink (DL) signal conditions associated with a serving Node B. The computer-readable medium further includes at least one instruction executable to cause the computer to trigger an out-of-sync state upon a determination that the DL signal conditions have degraded beyond a DL signal quality threshold. Moreover, the computer-readable medium includes at least one instruction executable to cause a computer to delay turning off of a power amplifier (PA) associated with transmission of uplink (UL) messages for a call performance improvement threshold time duration.

Further aspects include an apparatus for communication comprising means for monitoring downlink (DL) signal conditions associated with a serving Node B. The apparatus further comprises means for triggering an out-of-sync state upon a determination that the DL signal conditions have degraded beyond a DL signal quality threshold. Moreover, the apparatus comprises means for delaying turning off of a power amplifier (PA) associated with transmission of uplink (UL) messages for a call performance improvement threshold time duration.

Additional aspects include a user equipment apparatus comprising a memory storing executable instructions and a processor in communication with the memory, wherein the processor is configured to execute the instructions to monitor downlink (DL) signal conditions associated with a serving Node B. The processor is further configured to trigger an out-of-sync state upon a determination that the DL signal conditions have degraded beyond a DL signal quality threshold. Moreover, the processor is configured to delay turning off of a power amplifier (PA) associated with transmission of uplink (UL) messages for a call performance improvement threshold time duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to enhancing a wireless communication procedure at a user equipment (UE) to enable uplink (UL) transmissions during degraded downlink radio conditions and consequently improving call performance. For example, various aspects of the disclosure address an issue in out-of-sync handling, where the UE turns off a power amplifier (PA) during an out-of-sync state, and is thus unable to transmit on the associated uplink frequency.

An out-of-sync state may occur when the UE estimates the Dedicated Physical Control Channel (DPCCH) quality over the previous period (e.g., 160 ms period) to be worse than a threshold (e.g., $Q_{out}$). Further, an out-of sync state may also occur when a threshold number of the most recently received transport blocks (e.g., 20 blocks) with a non-zero length Cyclic Redundancy Check (CRC) attached, as observed on all Transport Channels (TrCH) using non-zero length CRC, have been received with incorrect CRC. In addition, over the previous period (e.g., 160 ms), all transport blocks with a non-zero length CRC attached have been received with incorrect CRC. In case no Transport Format Combination (TFCI) is used this criterion shall not be considered for the TrCHs not using guided detection if they do not use a non-zero length CRC in all transport formats. If no transport blocks with a non-zero length CRC attached are received over the previous period (e.g., 160 ms) this criterion shall not be assumed to be fulfilled.

As the PA is turned off and no UL transmissions are possible, signaling procedures might not be able to be triggered and/or sent in the UL to complete the various signaling procedures. Such signaling procedures may be intended to improve the call performance, and by prohibiting the UL transmissions, the UE may experience a radio link (RL) failure rather than being able to provide call performance information to the network.

For example, during degraded radio conditions, the serving cell's coverage may be weakening compared to a target cell. In such a case, under the Event 1D requirements, the target cell coverage needs to be better than the serving cell coverage for a time to trigger (TTT) duration in order to trigger a measurement request in the UL. The measurement request indicates a change over to the best available cell (e.g., a "Change of best cell" procedure). As a result, the network will initiate the signaling procedure in the DL to switch over the UE into the best available cell in order to improve call performance. However, if the UE switches over into the out-of-sync state before the TTT duration has expired then the measurement request will not be transmitted. Alternatively, the measurement request may have been transmitted and the UE may have received a signaling message to switch to the best available cell. In such a case, if the UE switches over to an out-of-sync state before the signaling message is sent from the UE to the network, then the signaling message will not be sent. In both instances, the UE will not be able to send data in the UL which will impact the call performance. As such, the present apparatus and methods are configured to enable UL transmissions during degrading DL radio conditions based on certain aspects described herein.

Figure 1:
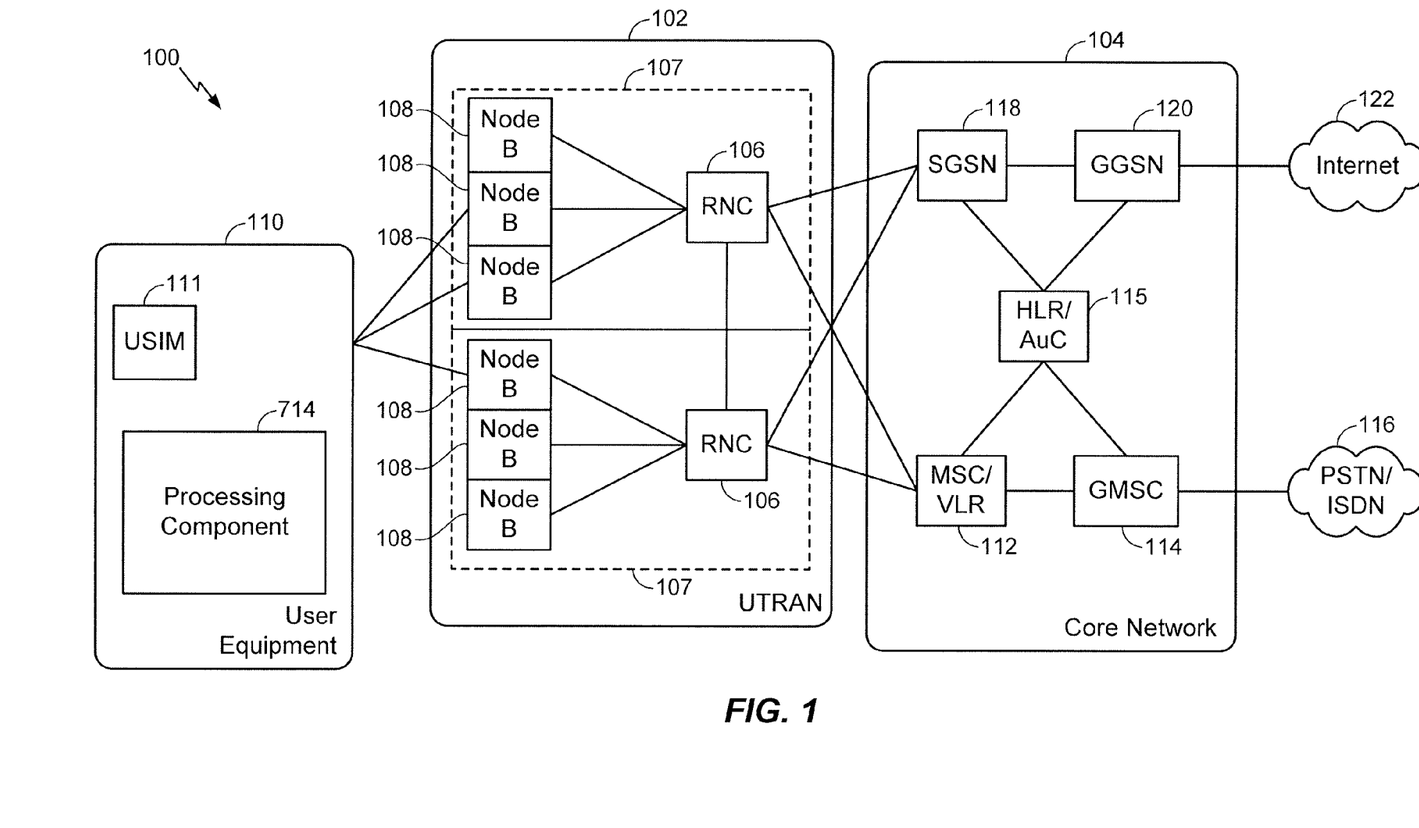
FIG. 1 is a block diagram conceptually illustrating an example of a telecommunications system for improving call performance during poor DL radio conditions.

The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system 100 employing a W-CDMA air interface and including a UE 110 including processing component 714 that may be the same as processing component 714 and its corresponding functions described with respect to FIGS. 4, 6, and 7. In particular, UE 110 may include the processing component 714 described herein. Processing component 714 may be configured to improve call performance during poor DL radio conditions. A UMTS network includes three interacting domains: a Core Network (CN) 104, a UMTS Terrestrial Radio Access Network (UTRAN) 102, and User Equipment (UE) 110. In this example, the UTRAN 102 provides various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the RNCs 106 and RNSs 107 illustrated herein. The RNC 106 is an apparatus responsible for, among other things, assigning, reconfiguring and releasing radio resources within the RNS 107. The RNC 106 may be interconnected to other RNCs (not shown) in the UTRAN 102 through various types of interfaces such as a direct physical connection, a virtual network, or the like, using any suitable transport network.

Communication between a UE 110 and a Node B 108 may be considered as including a physical (PHY) layer and a medium access control (MAC) layer. Further, communication between a UE 110 and an RNC 106 by way of a respective Node B 108 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a CN 104 for any number of mobile apparatuses.

Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The DL, also called the forward link, refers to the communication link from a Node B 108 to a UE 110, and the UL, also called the reverse link, refers to the communication link from a UE 110 to a Node B 108.

The CN 104 interfaces with one or more access networks, such as the UTRAN 102. As shown, the CN 104 is a GSM core network. However, as those skilled in the art will recognize, the various concepts presented throughout this disclosure may be implemented in a RAN, or other suitable access network, to provide UEs with access to types of CNs other than GSM networks.

The CN 104 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a VLR that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The CN 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Figure 2:
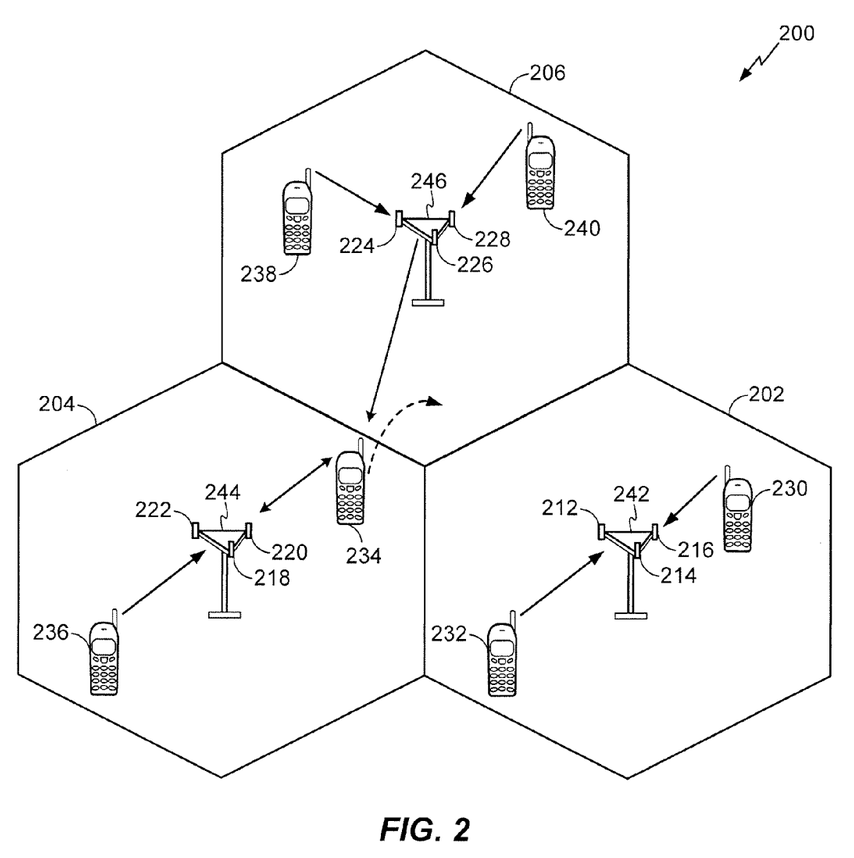
FIG. 2 is a conceptual diagram illustrating an example of an access network in accordance with an aspect of the present disclosure.

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 110 to increase the data rate or to multiple UEs 110 to increase the overall system capacity. This is achieved by spatially precoding each data stream and then transmitting each spatially precoded stream through a different transmit antenna on the downlink. The spatially precoded data streams arrive at the UE(s) 110 with different spatial signatures, which enables each of the UE(s) 110 to recover the one or more the data streams destined for that UE 110. On the uplink, each UE 110 may transmit one or more spatially precoded data streams, which enables the node B 108 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 4:
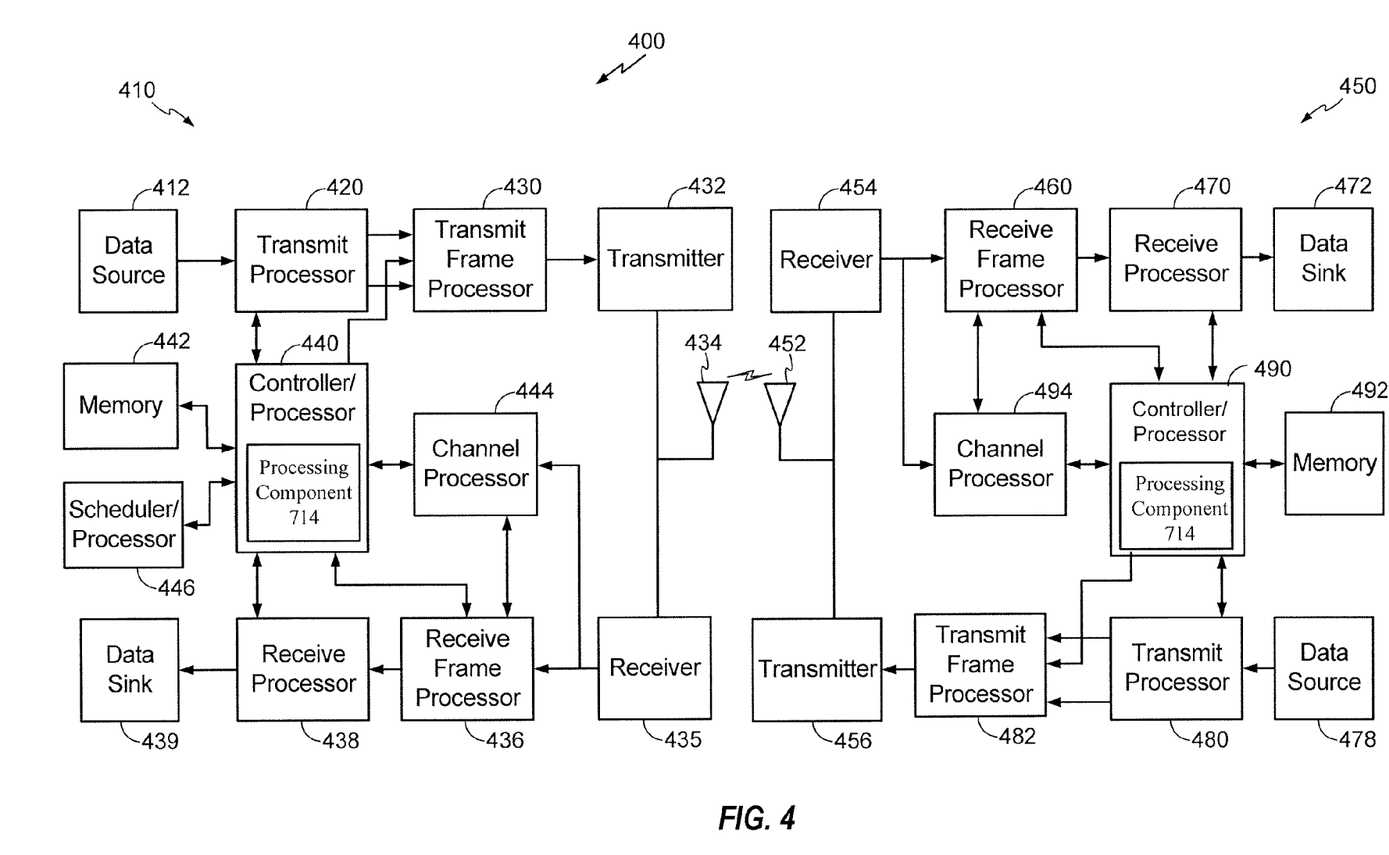
FIG. 4 is a block diagram conceptually illustrating an example of a Node B in communication with a UE in a telecommunications system in accordance with an aspect of the present disclosure.
Figure 6:
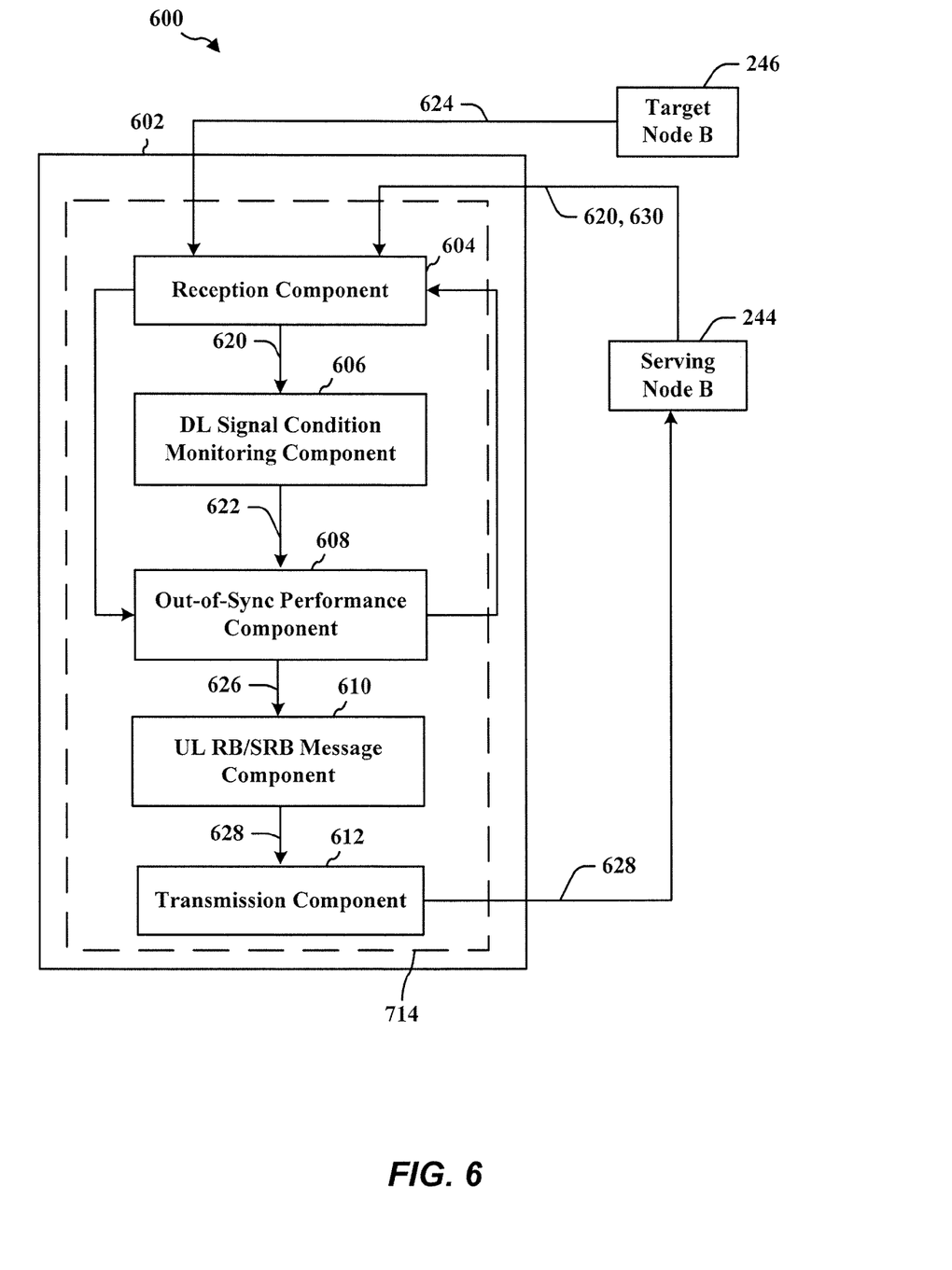
FIG. 6 is a conceptual data flow diagram illustrating the data flow between different modules/means/components in an exemplary apparatus in accordance with an aspect of the present disclosure.
Figure 7:
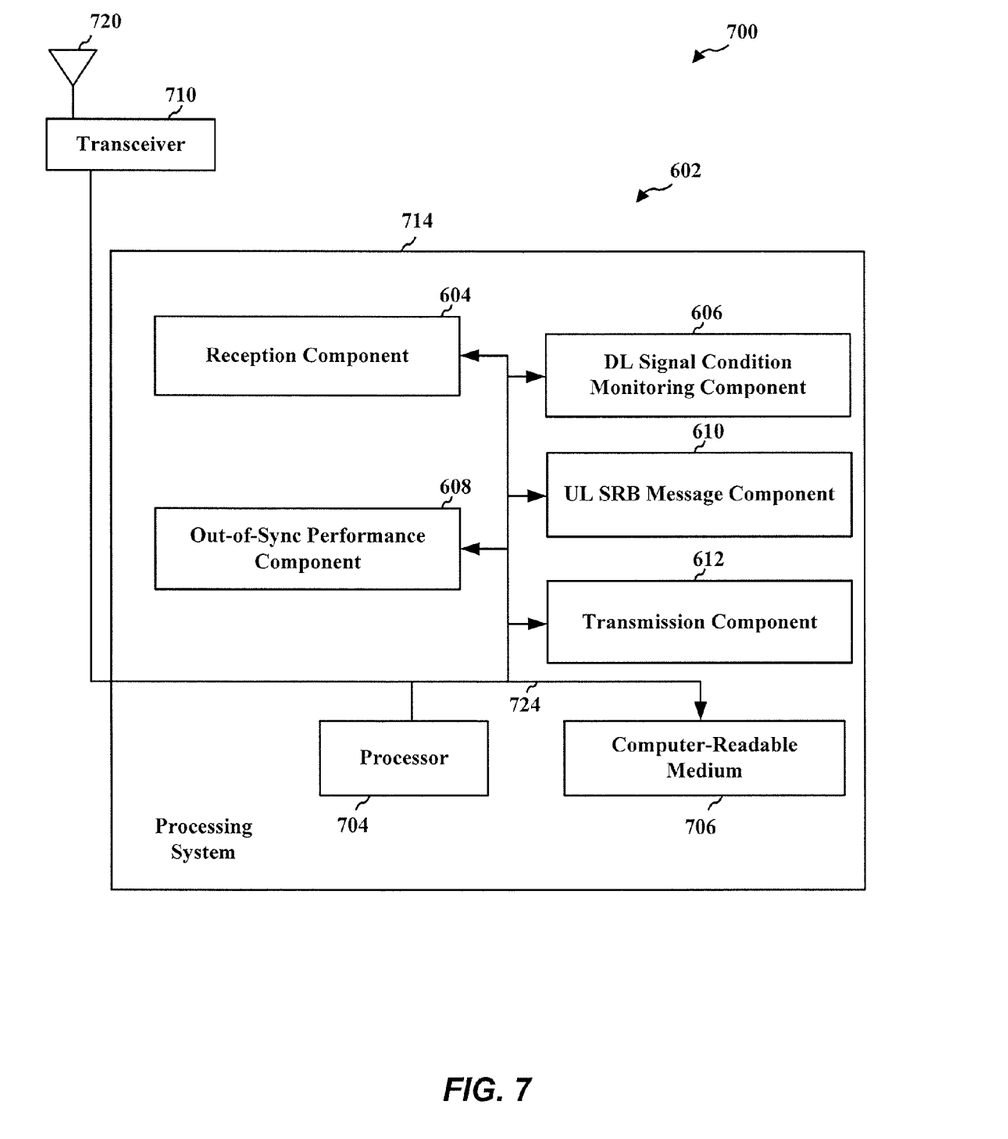
FIG. 7 is a diagram illustrating an example of a hardware implementation for an apparatus employing a processing component in accordance with an aspect of the present disclosure.

Referring to FIG. 2, an access network 200 in a UTRAN architecture is illustrated in which a UE, such as a UE the same as or similar to UE 110 (FIG. 1) including processing component 714 that may be the same as processing component 714 and its corresponding functions described with respect to FIGS. 4, 6, and 7. Processing component 714 may be configured to improve call performance during poor DL radio conditions. The multiple access wireless communication system includes multiple cellular regions (cells), including cells 202, 204, and 206, each of which may include one or more sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 may include several wireless communication devices, e.g., User Equipment or UEs, which may be in communication with one or more sectors of each cell 202, 204 or 206. For example, UEs 230 and 232 may be in communication with Node B 242, UEs 234 and 236 may be in communication with Node B 244, and UEs 238 and 240 can be in communication with Node B 246. Here, each Node B 242, 244, 246 is configured to provide an access point to a CN 104 (see FIG. 1) for all the UEs 230, 232, 234, 236, 238, 240 in the respective cells 202, 204, and 206. In particular, UEs 230, 232, 234, 236, 238, 240 may include the processing component 714 described herein.

As the UE 234 moves from the illustrated location in cell 204 into cell 206, a serving cell change (SCC) or handover may occur in which communication with the UE 234 transitions from the cell 204, which may be referred to as the source cell, to cell 206, which may be referred to as the target cell. Management of the handover procedure may take place at the UE 234, at the Node Bs corresponding to the respective cells, at a radio network controller 106 (see FIG. 1), or at another suitable node in the wireless network. For example, during a call with the source cell 204, or at any other time, the UE 234 may monitor various parameters of the source cell 204 as well as various parameters of neighboring cells such as cells 206 and 202. Further, depending on the quality of these parameters, the UE 234 may maintain communication with one or more of the neighboring cells. During this time, the UE 234 may maintain an Active Set, that is, a list of cells that the UE 234 is simultaneously connected to (e.g., the UTRA cells that are currently assigning a downlink dedicated physical channel DPCH or fractional downlink dedicated physical channel F-DPCH to the UE 234 may constitute the Active Set).

In an example operational aspect, UE 234 may determining that a signal received from a serving cell 204 Node B 244 is sufficiently weak to trigger (e.g., Event 1D) a Change of best cell procedure to another target cell. In such a procedure, a time to trigger (TTT) duration may be initiated and measurements for a target cell 206 and the serving cell 204 may be performed. A determination that the target cell 206 has a better signal quality than the serving cell 204 for the TTT duration triggers the Change of best cell procedure. A network entity (e.g., serving Node B 244) may trigger initiate the signaling procedure in DL to move the UE 234 into the best cell (e.g., target cell 206) to improve the call performance. In the degraded radio conditions, serving cell 204 may be going weak compared to target cell 206. As such, based on poor DL radio conditions associated with the serving Node B 244 and cell 204, UE 234 may enter an out-of-sync state. Where the UE 234 moves into out-of-sync indication state before the TTT is expired, the UE may delay turning off a PA associated with UL transmissions to allow a measurement report to be transmitted. Further, where the UE has transmitted a measurement report and UE received signaling message to move to the best cell, the UE may delay turning off the PA associated with UL transmissions to allow the UE to send out a signaling message response to complete the Change of best cell procedure.

In an aspect, the UE 234 may delay and/or avoid turning off the PA to allow one or both of radio bearers (RBs) and signaling resource bearers (SRBs) to be transmitted during an out-of-sync state. In an effort to reduce signaling transmitted at high powers in the UL during poor radio conditions, the UE 234 radio link control (RLC) (e.g., RLC 311) layer may report data RB buffer occupancy (BO) as zero or a function of actual buffer during the out-of-sync state. During the out-of-sync state, the UE 234 DL decoder may decode packet data units (PDUs). Further, as the PA has not been turned off, one or both of a RB and SRB message may be transmitted in UL during the out-of-sync state. In an operational aspect, the one or both UL RB and SRB message may indicate a measurement report with an event 1D in a Change of best cell procedure and a response in the one or both DL RB and SRB message may be a signaling message. Reception of such a signaling message may improve the UE call performance by allowing for successful transitioning of the UE 234 to a better cell (e.g., target cell 206). Further discussion of the UE 234 functionality during an out-of-sync state is discussed with reference to the flowchart described in FIG. 5.

The modulation and multiple access scheme employed by the access network 200 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 3.

Figure 3:
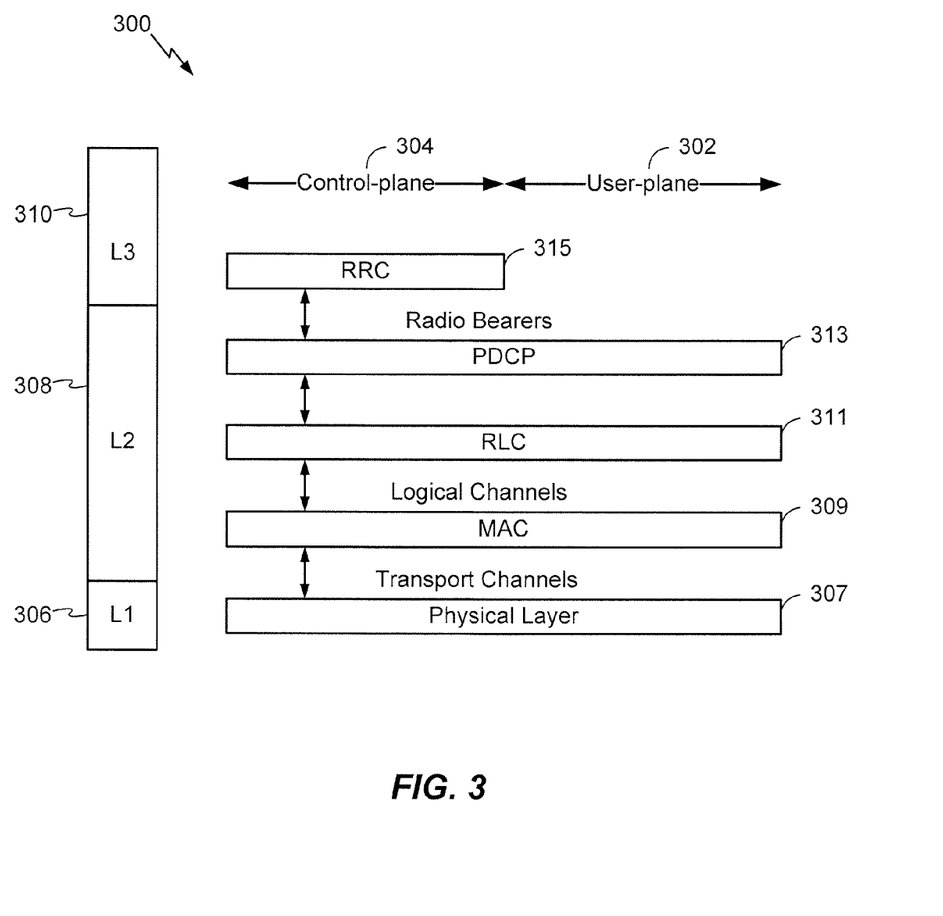
FIG. 3 is a conceptual diagram illustrating an example of a radio protocol architecture for the user and control plane in accordance with an aspect of the present disclosure.

Referring to FIG. 3 an example radio protocol architecture 300 relates to the user plane 302 and the control plane 304 of a UE or node B/base station. For example, architecture 300 may be included in a UE such as UE 110 (FIG. 1) including processing component 714 that may be the same as processing component 714 and its corresponding functions described with respect to FIGS. 4, 6, and 7. Processing component 714 may be configured to improve call performance during poor DL radio conditions.

The radio protocol architecture 300 for the UE and node B is shown with three layers: Layer 1 306, Layer 2 308, and Layer 3 310. Layer 1 306 is the lowest lower and implements various physical layer signal processing functions. As such, Layer 1 306 includes the physical layer 307. Layer 2 (L2 layer) 308 is above the physical layer 307 and is responsible for the link between the UE and node B over the physical layer 307. Layer 3 (L3 layer) 310 includes a radio resource control (RRC) sublayer 315. The RRC sublayer 315 handles the control plane signaling of Layer 3 between the UE and the UTRAN. The UE in FIG. 3 may be the same as UE 110. In particular, UE(s) may include the processing component 714 described herein.

In the user plane, the L2 layer 308 includes a media access control (MAC) sublayer 309, a radio link control (RLC) sublayer 311, and a packet data convergence protocol (PDCP) 313 sublayer, which are terminated at the node B on the network side. Although not shown, the UE may have several upper layers above the L2 layer 308 including a network layer (e.g., IP layer) that is terminated at a PDN gateway on the network side, and an application layer that is terminated at the other end of the connection (e.g., far end UE, server, etc.).

The PDCP sublayer 313 provides multiplexing between different radio bearers and logical channels. The PDCP sublayer 313 also provides header compression for upper layer data packets to reduce radio transmission overhead, security by ciphering the data packets, and handover support for UEs between node Bs. The RLC sublayer 311 provides segmentation and reassembly of upper layer data packets, retransmission of lost data packets, and reordering of data packets to compensate for out-of-order reception due to hybrid automatic repeat request (HARQ). The MAC sublayer 309 provides multiplexing between logical and transport channels. The MAC sublayer 309 is also responsible for allocating the various radio resources (e.g., radio bearers) in one cell among the UEs. The MAC sublayer 309 is also responsible for HARQ operations.

FIG. 4 is a block diagram of a Node B 410 in communication with a UE 450, where the Node B 410 may be the Node B 108 in FIG. 1, and the UE 450 may be the UE 110 in FIG. 1 including processing component 714 that may be the same as processing component 714 and its corresponding functions described with respect to FIGS. 6 and 7. Processing component 714 may be configured to improve call performance during poor DL radio conditions. It should be understood that processing component 714 may be included within or as part of one or more components and/or subcomponents of Node B 410, and may be configured to improve call performance during poor UL radio conditions. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols.

Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. The controller/processor 490 may include a processing component 714 operable to improve call performance during poor DL radio conditions. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

Figure 5:
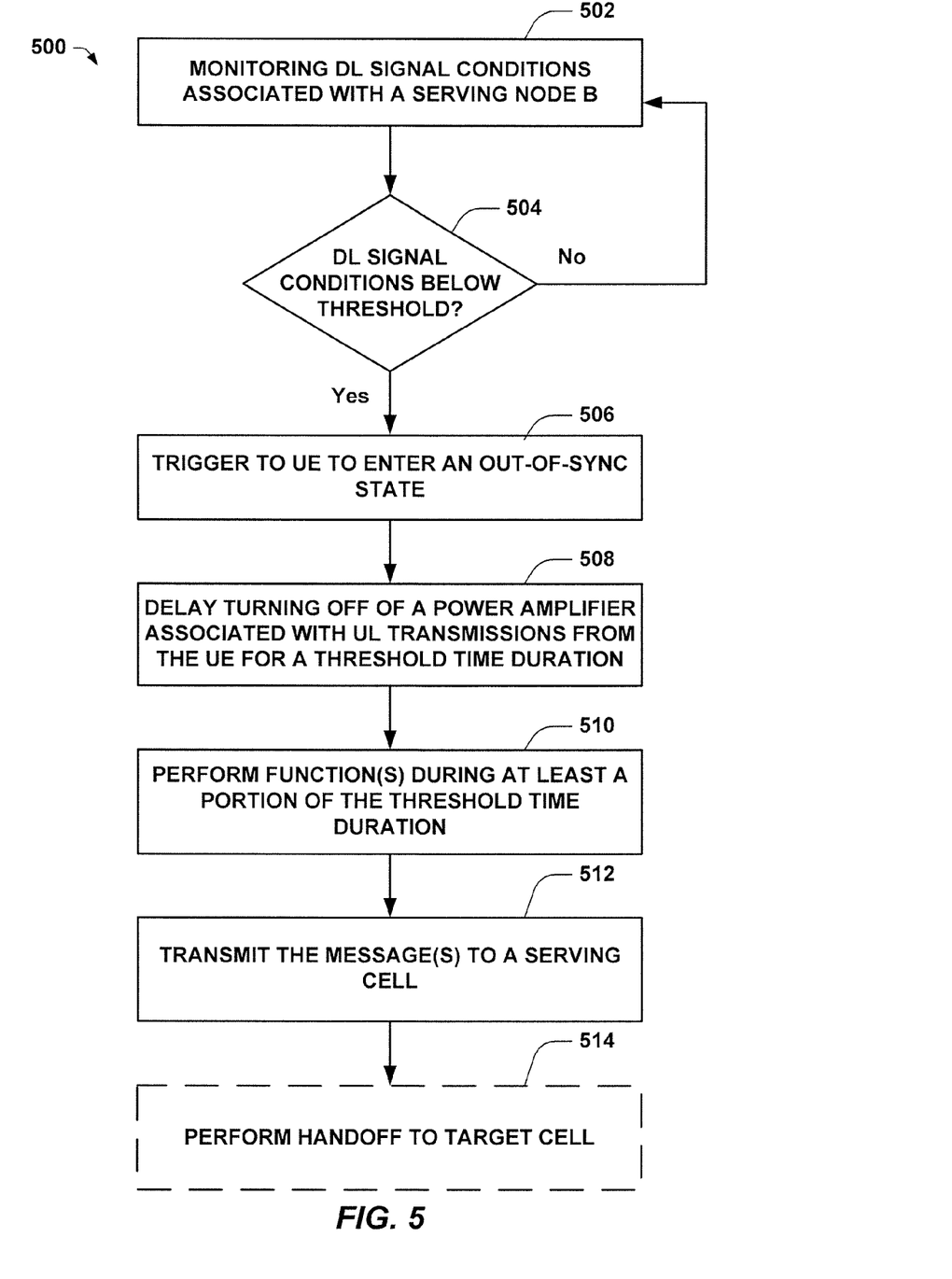
FIG. 5 is a flow chart of a first example methodology for improving call performance during poor downlink radio conditions in accordance with an aspect of the present disclosure.

Turning to FIG. 5, an example methodology 500 is displayed that improves call performance during poor DL radio conditions. In an aspect, the methodology may be performed by components associated with a UE (e.g., apparatus 602, FIG. 6) in a WCDMA based access network, but likewise may apply to at least parts of processing component 714 that may be the same as processing component 714 and its corresponding functions described with respect to FIGS. 1, 4, and 7.

In an aspect, at block 502, method 500 includes monitoring DL signal conditions associated with at least a serving Node B and/or one or more target Node Bs. For example, as described herein, apparatus 602 and/or reception component 604 (FIG. 6) may perform the monitoring of DL signaling 620 received from a serving Node B 244 and/or DL signals 624 received from a target Node B 246. In some aspects, the monitoring may include decoding received DL PDUs at a WCDMA layer 1.

At block 504, the method 500 may determine whether the DL signal conditions have fallen below a threshold level. For instance, as described herein, apparatus 602 and/or DL signal condition monitoring component 606 (FIG. 6) may perform the determination as to whether DL signal 620 conditions have fallen below a threshold level.

Further at block 504, the method 500 may determine that the DL signal conditions have not dropped below the threshold level, then the UE may continue to monitor the DL signal conditions at block 502. For instance, as described herein, apparatus 602 and/or DL signal condition monitoring component 606 (FIG. 6) may perform this determination.

Moreover, at 504, the method 500 may determine that the DL signal conditions have dropped below the threshold level, then at block 506, the UE may trigger an out-of-sync state to be imitated. For instance, as described herein, the DL signal conditions may also have triggered other measurement events to be initiated. For example, a TTT duration may have been initiated and/or may be initiated with or after the out-of-sync state has been initiated. In an aspect, the triggering of the UE may be performed by the apparatus 602 and/or out-of-sync performance component 608 (FIG. 6) based on the determination 622 that the DL signal conditions were below the threshold value.

At block 508, the method 500 may delay turning off of a PA associated with UL transmission from the UL for at least a threshold time duration. For instance, as described herein, the delaying may be performed by the apparatus 602 and/or out-of-sync performance component 608 (FIG. 6). In another aspect, the threshold time duration may be associated with the TTT time duration used as part of a "Change of best cell" procedure. Further, the out-of-sync performance component 608 may set to zero for data radio bearers (RBs), in a radio link control (RLC) layer buffer occupancy (BO) indication while maintaining one or both of a radio bearer (RB) and signaling resource bearer (SRB) for transmission of the one or more measurements. By setting at least a portion of the data RBs to zero, the UE may save power by avoiding to attempt to transmit data RBs during poor UL conditions. Further, where certain data RBs are indicated as important (e.g., emergency, priority, etc.), the UE may attempt to communicate these data RBs in the non-zeroed portions.

In addition, at block 510, the method 500 may continue monitoring the DL signals. For instance, as described herein, the apparatus 602 and/or out-of-sync performance component 608 (FIG. 6) may prompt reception component 604 to perform the measurements of DL signaling 620 received from a serving Node B 244 and/or DL signals 624 received from a target Node B 246. For example, DL signaling 620 may include DL SRB message such as an ActiveSetUpdate.

At block 512, the method 500 may transmit the measurements to a serving cell. For instance, as described herein, the apparatus 602 and/or out-of-sync performance component 608 (FIG. 6) may provide at least a portion of the measurements 626 to the UL RB/SRB message component 610 to be communicated in one or both of a RB and a SRB message 628 by transmission component 612. For example, the UL RB/SRB message may be Event 1D which may be used to improve call performance with successful handover. In another aspect, the transmission component 612 may be configured to transmit data message (e.g., emergency/high priority) data during an out-of-sync state.

Further, at block 514, the method may optionally include performing a hand off to a target cell. For instance, in an aspect, the measurements 628 may be transmitted by transmission component 612 to the serving Node B 244 (FIG. 6). In response to reception of one or both of the RB and SRB message, the serving Node B 244 may transmit a message 630 to the UE as part of a "Change of best cell" procedure. Thereafter, the UE may transmit a confirmation response using transmission component 612 and may perform the handover procedure to the target cell and target Node B 246.

FIG. 6 is a conceptual data flow diagram 600 illustrating the data flow between different modules/means/components in an exemplary apparatus 602. The apparatus 602 may be a wireless device (e.g., UE, etc.). As noted above with respect to the flowchart described in FIG. 5, the apparatus 602 may include processing component 714 that may be the same as processing component 714 and its corresponding functions described with respect to FIGS. 1, 4, and 7. Processing component 714 may be configured to improve call performance during poor DL radio conditions. For example, apparatus 602 and/or processing component 714 may include a reception component 604, a DL signal condition monitoring component 606, an out-of-sync performance component 608, a UL RB/SRB message component 610, and a transmission component 612.

The apparatus may include additional components that perform each of the steps of the algorithm in the aforementioned flow chart of FIG. 5. As such, each block in the aforementioned flow chart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 7 is a diagram 700 illustrating an example of a hardware implementation for an apparatus 602 employing a processing component 714 that may be the same as processing component 714 and its corresponding functions described with respect to FIGS. 1, 4, and 6. Processing component 714 may be configured to improve call performance during poor DL radio conditions. The processing component 714 may be implemented with a bus architecture, represented generally by the bus 724. The bus 724 may include any number of interconnecting buses and bridges depending on the specific application of the processing component 714 and the overall design constraints. The bus 724 links together various circuits including one or more processors and/or hardware components, represented by the processor 704, the components 604, 606, 608, 610, 612, and the computer-readable medium 706. The bus 724 may also link various other circuits such as timing sources, peripherals, voltage regulators, and power management circuits, which are well known in the art, and therefore, will not be described any further.

The processing component 714 may be coupled to a transceiver 710. The transceiver 710 is coupled to one or more antennas 720. The transceiver 710 provides a means for communicating with various other apparatus over a transmission medium. The processing component 714 includes a processor 704 coupled to a computer-readable medium 706. The processor 704 is responsible for general processing, including the execution of software stored on the computer-readable medium 706. The software, when executed by the processor 704, causes the processing component 714 to perform the various functions described supra for any particular apparatus. The computer-readable medium 706 may also be used for storing data that is manipulated by the processor 704 when executing software. The processing component further includes at least one of the components 604, 606, 608, 610, and 612. The components may be software modules running in the processor 704, resident/stored in the computer-readable medium 706, one or more hardware modules coupled to the processor 704, or some combination thereof. The processing component 714 may be a component of the wireless device 450 and may include the memory 492 and/or at least one of the TX processor 480, the RX processor 470, and the controller/processor 490.

In one configuration, the apparatus 602 for wireless communication includes means for monitoring DL signal conditions associated with a serving Node B, means for triggering an out-of-sync state upon a determination that the DL signal conditions have degraded beyond a DL signal quality threshold, and means for delaying turning off of a PA associated with transmission of UL messages for a call performance improvement threshold time duration. In an aspect, the apparatus 602 may further include means for performing one or more functions (e.g., DL signal quality measurements) during at least a portion of the call performance improvement threshold time duration, and means for transmitting a first message including at least one of signaling content or data content to the serving Node B. In an aspect, the apparatus 602 may further include means for receiving a second message from the serving Node B in response to the transmission of the first message. In an aspect, the apparatus 602 may further include means for setting to zero a portion of data RBs, in a RLC layer BO indication while maintaining one or both of a RB and SRB for transmission of the one or more measurements. In such an aspect, the apparatus 602 means for performing may be further configured to decode received DL PDUs at a WL1. Further, in an aspect, the apparatus 602 means for delaying may be further configured to determine that a call performance improvement procedure was initiated prior to the triggering, and delay the turning off of the PA to allow the call performance improvement procedure to be completed. In such an aspect, the apparatus 602 may include means for transmitting a confirmation response message after reception of the second message, and means for handing off to a target Node B based on the performed one or more measurements. In an aspect, the apparatus 602 means for transmitting may be configured to transmit high priority data (e.g., emergency data) in while the UE is in the out-of-sync state.

The aforementioned means may be one or more of the aforementioned components of the apparatus 602 and/or the processing component 714 of the apparatus 602 configured to perform the functions recited by the aforementioned means.

As described supra, the processing component 714 may include the TX processor 480, the RX processor 470, and the controller/processor 490. As such, in one configuration, the aforementioned means may be the TX processor 480, the RX processor 470, and the controller/processor 490 configured to perform the functions recited by the aforementioned means.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing component" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing component may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing component, external to the processing component, or distributed across multiple entities including the processing component. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
monitoring, by a user equipment (UE), downlink (DL) signal conditions associated with a serving Node B;
triggering an out-of-sync state upon a determination that the DL signal conditions have degraded beyond a DL signal quality threshold; and
delaying turning off of a power amplifier (PA) associated with transmission of uplink (UL) messages for a call performance improvement threshold time duration, wherein the delaying includes setting at least a portion of data radio bearers (RBs) to zero in a radio link control (RLC) layer buffer occupancy (BO) indication while maintaining one or both of a data RB and signaling resource bearer (SRB) for transmission of one or more measurements.

2. The method of claim 1, further comprising:
performing one or more functions during at least a portion of the call performance improvement threshold time duration; and
transmitting a first message including at least one of signaling content or data content to the serving Node B.

3. The method of claim 2, wherein the first message is a measurement report associated with a Change of Best Cell procedure, and further comprising:
receiving a second message from the serving Node B in response to the transmission of the first message.

4. The method of claim 3, wherein the second message is at least one of a data message or a signaling message.

5. The method of claim 3, further comprising:
transmitting a confirmation response message after reception of the second message; and
handing off to a target Node B based on the performed one or more measurements.

6. The method of claim 2, wherein the performing further comprises decoding received downlink (DL) packet data units (PDUs) at a wideband code division multiple access (WCDMA) layer 1.

7. The method of claim 1, wherein the delaying further comprises:
determining that a call performance improvement procedure was initiated prior to the triggering; and
delaying the turning off of the PA to allow the call performance improvement procedure to be completed.

8. The method of claim 7, wherein the call performance improvement procedure comprises a Change of Best Cell procedure.

9. The method of claim 1, wherein the call performance improvement threshold time duration corresponds to a time to trigger (TTT) for a Change of Best Cell procedure.

10. The method of claim 1, further comprising:
transmitting high priority data in while the UE is in the out-of-sync state.

11. The method of claim 10, wherein the high priority data is an emergency data message.

12. A non-transitory computer-readable medium storing computer-executable code, comprising:
code for monitoring, by a user equipment (UE), downlink (DL) signal conditions associated with a serving Node B;
code for triggering an out-of-sync state upon a determination that the DL signal conditions have degraded beyond a DL signal quality threshold; and
code for delaying turning off of a power amplifier (PA) associated with transmission of uplink (UL) messages for a call performance improvement threshold time duration, wherein the code for delaying includes code for setting at least a portion of data radio bearers (RBs) to zero in a radio link control (RLC) layer buffer occupancy (BO) indication while maintaining one or both of a data RB and signaling resource bearer (SRB) for transmission of one or more measurements.

13. An apparatus for communication, comprising:
means for monitoring downlink (DL) signal conditions associated with a serving Node B;
means for triggering an out-of-sync state upon a determination that the DL signal conditions have degraded beyond a DL signal quality threshold; and
means for delaying turning off of a power amplifier (PA) associated with transmission of uplink (UL) messages for a call performance improvement threshold time duration, wherein the means for delaying includes means for setting at least a portion of data radio bearers (RBs) to zero in a radio link control (RLC) layer buffer occupancy (BO) indication while maintaining one or both of a data RB and signaling resource bearer (SRB) for transmission of one or more measurements.

14. A user equipment apparatus, comprising:
a memory storing executable instructions; and
a processor in communication with the memory, wherein the processor is configured to execute the instructions to:
monitor downlink (DL) signal conditions associated with a serving Node B;
trigger an out-of-sync state upon a determination that the DL signal conditions have degraded beyond a DL signal quality threshold; and
delay turning off of a power amplifier (PA) associated with transmission of uplink (UL) messages for a call performance improvement threshold time duration, wherein the processor is configured to delay by setting at least a portion of data radio bearers (RBs) to zero in a radio link control (RLC) layer buffer occupancy (BO) indication while maintaining one or both of a data RB and signaling resource bearer (SRB) for transmission of one or more measurements.

15. The user equipment apparatus of claim 14, further comprising:
performing one or more functions during at least a portion of the call performance improvement threshold time duration; and
transmitting a first message including at least one of signaling content or data content to the serving Node B.

16. The user equipment apparatus of claim 15, wherein the first message is a measurement report associated with a Change of Best Cell procedure, and further comprising:
receiving a second message from the serving Node B in response to the transmission of the first message.

17. The user equipment apparatus of claim 16, wherein the second message is at least one of a data message or a signaling message.

18. The user equipment apparatus of claim 16, further comprising:
transmitting a confirmation response message after reception of the second message; and
handing off to a target Node B based on the performed one or more measurements.

19. The user equipment apparatus of claim 18, wherein the performing further comprises decoding received downlink (DL) packet data units (PDUs) at a wideband code division multiple access (WCDMA) layer 1.

20. The user equipment apparatus of claim 14, wherein the delaying further comprises:
determining that a call performance improvement procedure was initiated prior to the triggering; and
delaying the turning off of the PA to allow the call performance improvement procedure to be completed.

21. The user equipment apparatus of claim 20, wherein the call performance improvement procedure comprises a Change of Best Cell procedure.

22. The user equipment apparatus of claim 14, wherein the call performance improvement threshold time duration corresponds to a time to trigger (TTT) for a Change of Best Cell procedure.

23. The user equipment apparatus of claim 14, further comprising:
transmitting high priority data in while the UE is in the out-of-sync state.

24. The user equipment apparatus of claim 23, wherein the high priority data is an emergency data message.

* * * * *